United States Patent
Moore et al.

(10) Patent No.: US 12,212,971 B2
(45) Date of Patent: Jan. 28, 2025

(54) CONVEYANCE OF STIR/SHAKEN ATTESTATION LEVELS USING CARRIER CODE

(71) Applicant: Level 3 Communications, LLC, Broomfield, CO (US)

(72) Inventors: Richard D. Moore, Frederick, CO (US); Daniel W. Peele, Pensacola, FL (US); Matthew C. Hess, Broomfield, CO (US)

(73) Assignee: Level 3 Communications, LLC, Denver, CO (US)

( * ) Notice: Subject to any disclaimer, the term of this patent is extended or adjusted under 35 U.S.C. 154(b) by 273 days.

(21) Appl. No.: 17/957,390

(22) Filed: Sep. 30, 2022

(65) Prior Publication Data
US 2023/0120695 A1    Apr. 20, 2023

Related U.S. Application Data

(60) Provisional application No. 63/255,995, filed on Oct. 15, 2021.

(51) Int. Cl.
| H04L 29/06 | (2006.01) |
| H04L 9/40 | (2022.01) |
| H04W 12/60 | (2021.01) |

(52) U.S. Cl.
CPC ......... *H04W 12/66* (2021.01); *H04L 63/0823* (2013.01); *H04L 63/105* (2013.01); *H04L 63/1466* (2013.01)

(58) Field of Classification Search
None
See application file for complete search history.

(56) References Cited

U.S. PATENT DOCUMENTS

| 2020/0336314 A1* | 10/2020 | Barakat | ................ H04L 9/3247 |
| 2023/0088868 A1* | 3/2023 | Haltom | ............... H04L 65/1104 370/352 |

\* cited by examiner

*Primary Examiner* — Andrew J Steinle (57) ABSTRACT

The present disclosure describes providing an attestation level to a received communication. The attestation level may be used to communicate a level of security to a network or a called party that receives the communication. The attestation level associated with the communication may indicate to a destination network and/or recipient that the phone number associated with the communication is secure and/or the telephone number has not been spoofed. Determining the attestation level comprises comparing information associated with the communication with stored information and assigning a code based on the comparison. The code may be translated to a tag value that is used to direct the communication to a signing server for attesting the communication at the determined attestation level.

20 Claims, 5 Drawing Sheets

CONVEYANCE OF STIR/SHAKEN ATTESTATION LEVELS USING CARRIER CODE

CROSS-REFERENCE TO RELATED APPLICATIONS

This application claims the benefit of U.S. Provisional Application No. 63/255,995, filed Oct. 15, 2021, entitled "CONVEYANCE OF STIR/SHAKEN ATTESTATION LEVELS USING CARRIER CODE," which is incorporated herein by reference in its entirety.

BACKGROUND

A robocall may include an automated phone call that may be generated by a computer system. For example, robocalls oftentimes include a recorded message that plays when a connection is made with a called party. In some cases, a robocall may alter or spoof the calling number in an attempt to deceive the called party. For example, when the called party receives a robocall, the calling number may be spoofed in order to appear as if the called party is receiving a call from a legitimate business, a neighbor, etc.

SUMMARY

The present disclosure describes a system and method for providing an attestation level for a received communication, such as, for example, a telephone call. The attestation level may be used to communicate a level of security to a network or a called party (or other recipient) that receives the communication. For example, an attestation level associated with a communication may indicate to a destination network and/or recipient that the phone number associated with the communication is secure or has not been spoofed.

Accordingly, the present application describes a method for providing an attestation level for a communication. In some examples, the method includes: receiving a communication addressed to a destination network; determining a uniform resource identifier associated with a calling party of the communication; determining, based at least in part on the uniform resource identifier, an attestation level for which the communication is eligible; appending a code to the communication, wherein the code indicates the attestation level; using the appended code to determine a virtual trunk to assign to the communication, wherein the assigned virtual trunk is associated with the attestation level; associating a tag with the communication, wherein the tag corresponds to the virtual trunk; and providing the communication to a routing engine via the virtual trunk for providing an attestation based at least in part on the tag.

The present application also describes a system for determining an attestation level for a communication comprising: a first routing engine for associating a tag with a received communication, wherein the first routing engine operates to: receive a communication addressed to a destination network; determine a uniform resource locator associated with a calling party of the communication; determine, based at least in part on the uniform resource locator, an attestation level for which the communication is eligible; append a code to the communication, wherein the code indicates the attestation level; use the appended code to determine a virtual trunk to assign to the communication, wherein the assigned virtual trunk is associated with the attestation level; associate a tag with the communication, wherein the tag corresponds to the virtual trunk; and provide the communication to a second routing engine via the virtual trunk for providing an attestation based at least in part on the tag.

The present application also describes another method for determining an attestation level for a communication. In some examples, the method includes: receiving a communication addressed to a destination network; determining a uniform resource identifier associated with a calling party of the communication, the first property comprising an originating telephone number and enterprise-specific domain; determining, based on the uniform resource identifier, an originating telephone number and an originating domain; when the originating domain is determined to be an eligible enterprise specific domain, determining whether the originating telephone number is associated with the enterprise specific domain and a subscriber telephone; when the originating telephone number is associated with the enterprise specific domain and a subscriber number, determining that the communication is eligible for a first level of attestation; and when the originating telephone number is associated with the enterprise specific domain and not a subscriber number, determining that the communication is eligible for a second level of attestation; and when the originating domain is determined to not be an eligible enterprise specific domain, determining that the communication is eligible for a third level of attestation; appending a code to the communication, wherein the code indicates the level of attestation; using the appended code to determine a virtual trunk to assign to the communication, wherein the assigned virtual trunk is associated with the level of attestation; associating a tag with the communication, wherein the tag corresponds to the virtual trunk; providing the communication to a routing engine via the virtual trunk; providing, by the routing engine, an attestation at the level of attestation based at least in part on the tag; signing the communication with an encrypted certificate; and routing the communication with the attestation to the destination network.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following figures.

DETAILED DESCRIPTION

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Examples may be practiced as methods, systems or devices. Accordingly, examples may take the form of a hardware implementation, an entirely software implementation, or an implementation combining software and hardware aspects. The following detailed description is therefore not to be taken in a limiting sense, and the scope of the present disclosure is defined by the appended claims and their equivalents.

Robocallers often spoof their calls to indicate to a receiver of the call (e.g., via a caller ID), that the call originates from a different source. In one example, a robocall may spoof the phone number of a government agency in an attempt to get the call recipient to divulge confidential information such as a social security number, a credit card number, or a bank account number. In an attempt to combat this, the STIR/SHAKEN protocol was developed. STIR, short for "Secure Telephony Identity Revisited," is used to verify the caller ID of received calls in a voice-over-IP (VoIP) system.

Figure 1:
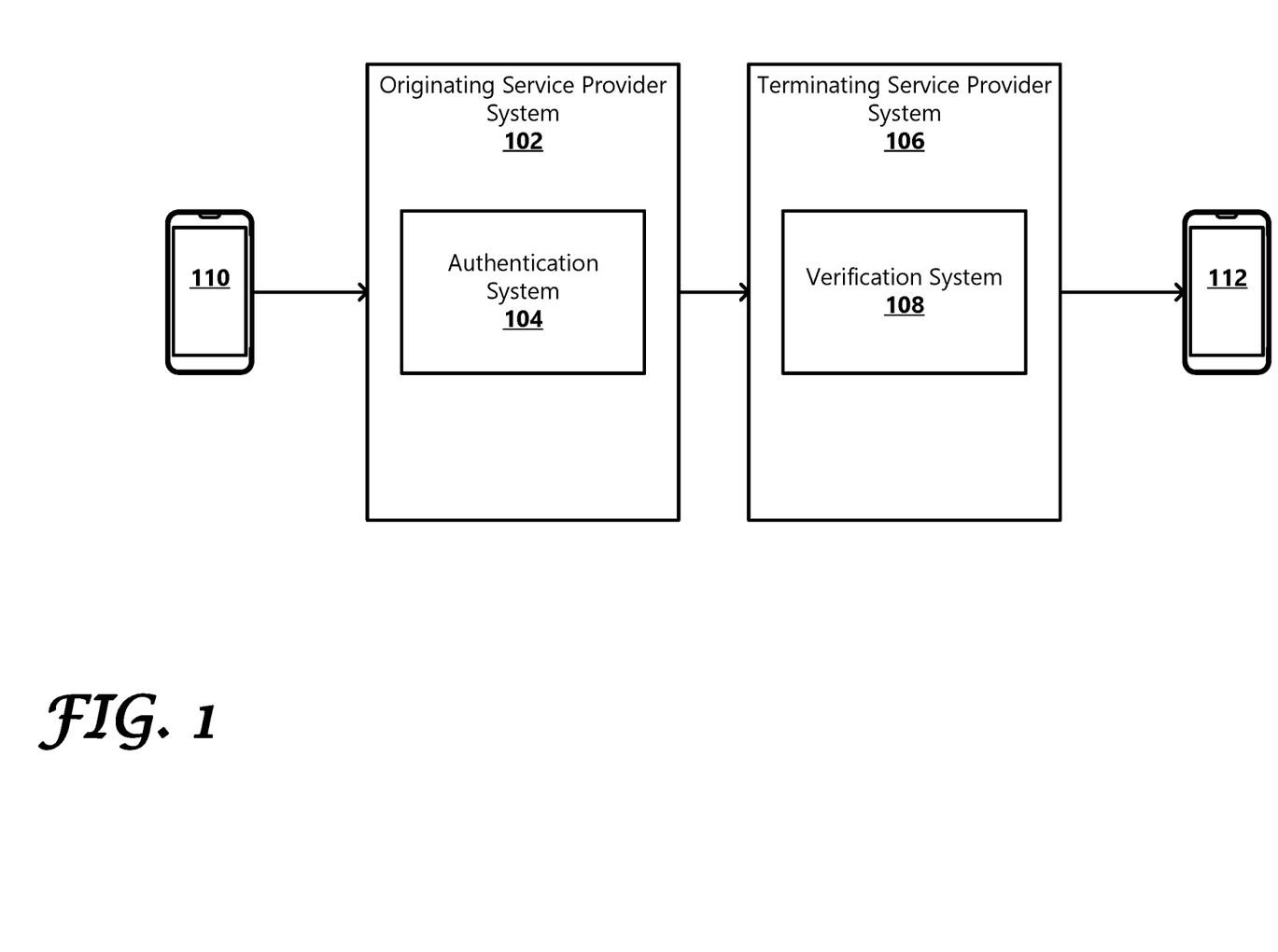
FIG. 1 illustrates an example operating environment for implementing a system for providing an attestation level to a communication.

For example, and as shown in FIG. 1, when a call is received in a VoIP system, an originating service provider system 102 may check the call source and calling number of the calling party 110 to determine how to attest for the validity of the calling number. According to one example, the originating service provider system 102 may include a system, such as the system 200 described in FIG. 2, to determine and provide an attestation level for the call. For example, the service provider system 102 may examine the caller ID of the calling party 110 and compare it to a list of caller IDs provided by the service provider. If there is a match, an authentication system 104 included in or in communication with the originating service provider system 102 may attach an encrypted certificate to the call. The encrypted certificate may enable a terminating service provider system 106 to verify an attestation level or trust value assigned to the call. The encrypted certificate and the call are then provided to a destination such as, for example, the terminating service provider system 106 and/or a called party 112. According to one example implementation, the encrypted certificate may be passed along with a call setup message, which in a VoIP system, may be a session initiation protocol (SIP) INVITE message.

SHAKEN, short for "Signature-based Handling of Asserted information using toKENs" is used for non-VoIP systems (e.g., cell phones, public switched telephone networks (PSTN), etc.). Like the STIR protocol, the SHAKEN protocol is primarily used to determine whether a caller ID of a cell phone or PSTN-based call has been spoofed.

The STIR/SHAKEN protocol provides for three different levels of verification or attestation—Full Attestation (Level A), Partial Attestation (Level B) and Gateway Attestation (Level C). In order to achieve Full Attestation, the originating service provider system 102 must be able to authenticate the calling party 110 and verify that the calling party 110 is authorized to use the calling number. In order to achieve Partial Attestation, the originating service provider system 102 must be able to authenticate the origin of the call but is not required to verify that the calling party 110 is authorized to use the calling number. In order to achieve Gateway Attestation, the originating service provider system 102 must be able to authenticate from where the call was received even if the service provider cannot authenticate the source of the call.

Once the call and the attestation level are received by a destination network, the destination network can determine how the call should be handled. For example, the terminating service provider system 106 of the called party 112 may include or be in communication with a verification system 108 that may operate to perform a verification of the encrypted certificate. In some examples, if a call with a Level A attestation is received by a terminating service provider system 106, the terminating service provider system 106 is able to determine that the caller ID of the received call is accurate. As such, the terminating service provider system 106 may forward the call to the intended called party 112. However, if the terminating service provider system 106 receives a call with a Level C attestation, the terminating service provider system 106 may determine whether to change the caller ID associated with the call (e.g., change the caller ID from a number or name to "Unknown") and/or forward the call to the called party 112. Some terminating service provider systems 106 may also automatically filter out any call with a Level C attestation or provide its customers with the opportunity to do so.

An ability to accurately and efficiently determine a level of attestation to assign a call may be desirable for a communication service provider, such as the originating service provider system 102. For example, it may be desirable for the originating service provider system 102 to be able to accurately communicate the attestation level for which the call may be eligible as the call transits the originating service provider system 102 based on standard signaling information and information stored by the originating service provider system 102. It may be further desirable to separate operations associated with determining and communicating the attestation level from operations associated with assigning the attestation level and signing the call. Accordingly, concentrating attestation level assignment and signing operations to one server (or group of servers) and utilizing another server (or group of servers) to determine and communicate the attestation levels may reduce licensing costs and improve accuracy and computational efficiency.

Figure 2:
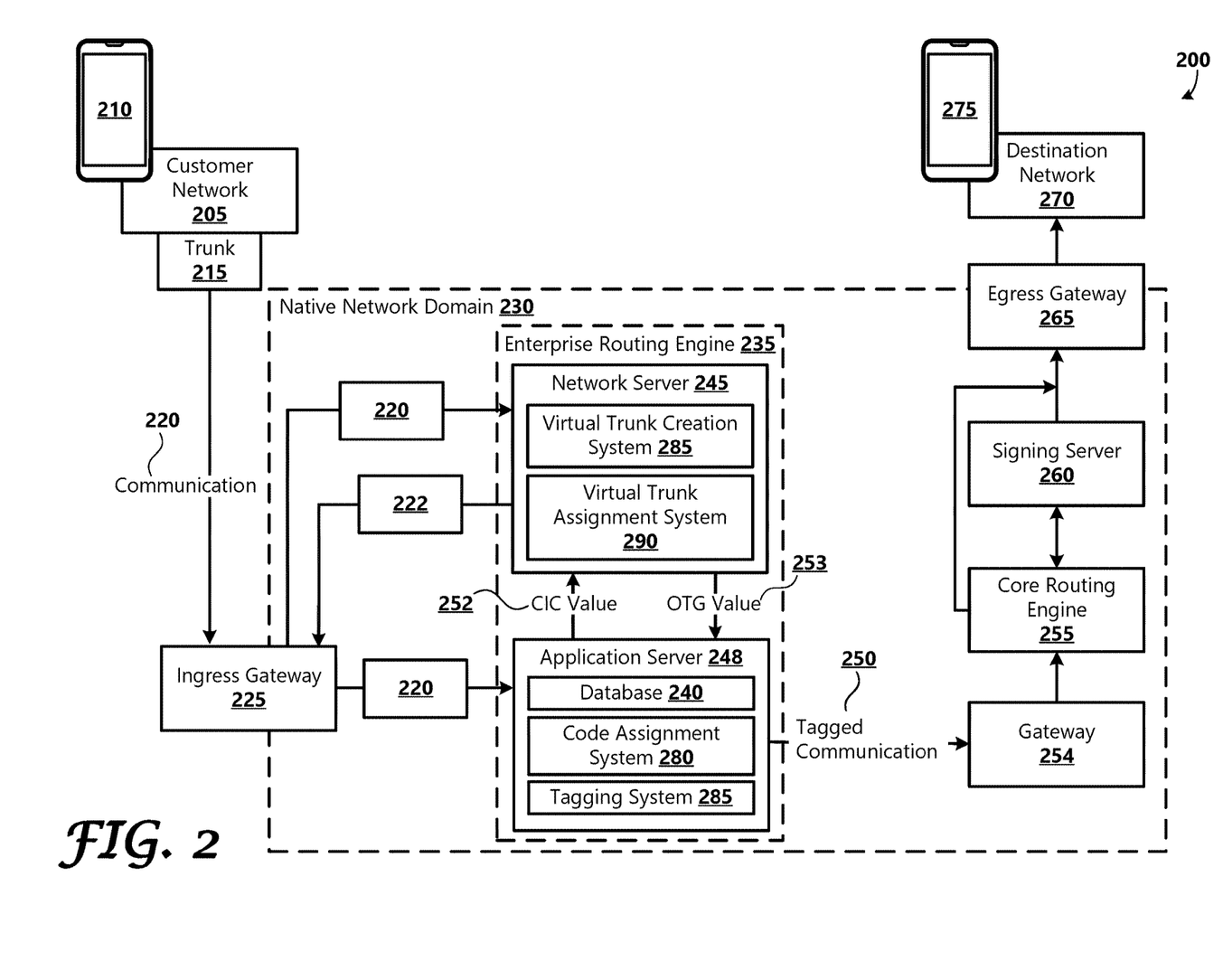
FIG. 2 illustrates an example system for providing an attestation level to a communication.

As such, the present disclosure describes a coding and tagging system and process that can be used to communicate which calls should be attested at various attestation levels. For example, when a call is received by a routing engine of the communication service provider system 102, it may be desirable to know or otherwise determine at what level calls should be attested. Thus, the routing engine may be able to easily identify the attestation level to assign calls, which may then be routed to a signing server to obtain an encrypted certificate and an encoding of the attestation level value assigned to the communication. The coding process may enable the service provider system 102 to communicate attestation eligibility information within the system 200, such that the communication can be tagged with attestation level information appropriately. In some examples, the coding process may use a header of the communication to communicate the attestation level information. Using a code in the header may enable the service provider system 102 to implement the coding process to communicate attestation level information within the service provider system 102 without defining new domains or overriding a domain included in the communication. For example, in some communication network systems, domains specified in communications may be utilized by other components, and it can be advantageous to avoid modifying or overwriting such domains.

The coding, tagging, and/or the subsequent attestation level may be based on different factors. These factors may include an area or market from which the call originates and/or a customer network from which the call originates. Thus, information about a domain associated with the call may be used to determine the attestation level of the call. In another example, information about a trunk associated with the call may be used to determine the attestation level of the call. In yet another example, information about a domain associated with a call, in combination with information about a trunk associated with the call, may be used to determine the attestation level of the call.

These and other examples will be explained in more detail below with respect to FIGS. 2-4. It will be appreciated that the examples shown by the figures and described herein may be used across the various implementations (e.g., domain level attestation, trunk level attestation, and domain and trunk level attestation) described herein.

FIG. 2 illustrates an example system 200 for providing an attestation level for a communication 220 according to an example. In some examples, the communication 220 is a telephone call. In some examples, the communication 220 may be provided via a Voice over Internet Protocol (VoIP) system. In other examples, the communication 220 may be provided via a cellular system or via a PSTN system. According to an example implementation, a call setup protocol, such as Session Initiation Protocol (SIP) may be utilized to set up a call session between a calling device 210 and a destination device 275, and the Real-time Transport Protocol (RTP) may be utilized to send voice data between a calling party (e.g., the calling device 210) and a called party (e.g., the destination device 275).

In the example shown in FIG. 2, the system 200 includes a calling device 210 associated with a customer network 205. The customer network 205 may be associated with an enterprise such as, for example, a university, a business, a corporation, a government entity, and the like. In such examples, a communication service provider (e.g., a provider of a native network domain 230) provides communication services to the enterprise according to a service level agreement. As part of the agreement, the communication service provider may assign the enterprise a set of telephone numbers and/or an enterprise specific domain. Thus, each calling device 210 associated with the enterprise may be provided with a particular telephone number and be associated with the enterprise specific domain.

As briefly mentioned above, the communication service provider may provide a native network domain 230 that routes received communications 220 from an origin to a destination. For example, the native network domain 230 may include an ingress gateway 225 for providing a communication service to various calling devices 210 of a customer network 205. The native network domain 230 may also provide an egress gateway 265 for providing access to communication services provided by a destination network 270 and/or a destination device 275 associated with the destination network 270. Although a single ingress gateway 225 and a single egress gateway 265 are shown, the system 200 may include multiple ingress gateways and/or egress gateways.

In some examples, the ingress gateway 225 may be associated with or otherwise assigned to a trunk 215 and the trunk 215 may be assigned to the customer network 205. Thus, when the native network domain 230 receives a communication 220 from a calling device 220 of the customer network 205, the trunk 215 may provide information (e.g., identity information or properties such as a calling number, an enterprise specific domain, etc.) about the communication 220 to the ingress gateway 225. Because the ingress gateway 225 is associated with the customer network 205, the ingress gateway 225 may also "know" that any communication 220 received from the customer network 205 is to be attested. In some examples, the ingress gateway 225 may be associated with multiple customer networks and/or trunks. In such examples, the customer and/or the customer network may be identified by an IP address, an interface, and/or other parameters associated with an incoming communication. Just like the example above, this information may be used to determine which communications should be attested and may also determine the attestation level.

For example, a provider of the customer network 205 and/or native network domain 230 may desire that communications originating from its customer network 205 be attested at a particular attestation level (e.g., Level A). Thus, when the ingress gateway 225 receives a communication 220 from the customer network 205 and/or its associated trunk 215, the ingress gateway 225 may determine that the communication 220 is from the customer network 205 and appropriately route the communication 220 such that it is attested at the particular attestation level. For example, the ingress gateway 225 may provide the communication 220 to an enterprise routing engine 235. The enterprise routing engine 235, for example, may operate to determine an attestation level for the communication 220. According to an aspect, the enterprise routing engine 235 may further operate to communicate the attestation level to a separate server or group of servers (e.g., a core routing engine 255) utilizing a code inserted into standard signaling information. For example, this may enable the core routing engine 255, which may be configured to utilize the STIR/SHAKEN protocol and procedures to assign the attestation level to the communication 220 according to the STIR/SHAKEN protocol. Among other aspects, this may permit proper attestation without requiring all network elements of the native network domain 230 to be licensed STIR/SHAKEN servers, as the signaling of the appropriate attestation level can be done from the enterprise routing engine 235 without using STIR/SHAKEN signaling protocols.

As shown in FIG. 2, the enterprise routing engine 235 may include at least one network server 245 and at least one application server 248. According to one example, in providing the communication 220 to the enterprise routing engine 235, the ingress gateway 225 may first provide the communication 220 to a network server 245. As will be described in further detail below, in some examples, the network server 245 may include a virtual trunk creation system 285 and a virtual trunk assignment system 290. The virtual trunk creation system 285 may be used to create one or more virtual trunks (or virtual trunk groups) that can be assigned or otherwise associated with the communication 220. Once the virtual trunks are created, the virtual trunk assignment system 290 assigns the communication 220 to a particular virtual trunk.

According to an example, the network server 245 may operate to receive the communication 220 and determine one or more properties associated with the communication 220. The one or more properties may include the domain associated with the communication 220, a telephone number associated with the communication 220, a location from which the communication 220 originated, a trunk 215 associated with the communication 220, etc. The network server 245 may compare the one or more properties associated with the communication 220 with information received or accessed from a database 240. For example, the database 240 may be one of a plurality of databases 240 associated with a plurality of application servers 248 that may include information as to whether the telephone number, the trunk 225 and/or the domain is/are associated with a customer network 205 and/or enterprise that is eligible for a particular attestation level.

In some examples, the network server 245 may be further configured to determine an application server 248 to which the communication 220 should be directed based on the one or more properties associated with the communication 220. For example, the network server 245 may be programmed to determine an application server 248 associated with the telephone number or the enterprise specific domain included in a header of the communication 220. As mentioned above, in an example implementation, SIP may be utilized as a signaling protocol to establish the call session between the calling device 210 and the destination device 275. Thus, the communication 220 may be or include a SIP INVITE request that may be utilized as part of establishing the call session. A SIP INVITE request may include various SIP headers that may provide various information about the communication 220 and call session attributes.

One example SIP header may include a "FROM" header that may indicate the logical identity of the initiator of the communication 220 (e.g., the calling party 110). For example, the "FROM" header may include a Uniform Resource Identifier (URI) and optionally a display name. The URI, for example, may include the calling device's 210 SIP telephone number and the enterprise specific domain (e.g., calling_user@domain) associated with the calling party's customer network 205 and/or enterprise.

Another example SIP header may include a "P-Asserted-Identity" or "PAI" header that may be used to convey a proven identity of the originator of the communication 220 (e.g., the calling device 210) within a trusted network (e.g., the native network domain 230). The "PAI" header may include a PAI value, which may include a URI and an optional display name. For example, the URI may include the calling device's SIP telephone number and the enterprise specific domain associated with the calling party's customer network 205 and/or enterprise (e.g., calling_user_tn@domain). According to an aspect, information included in the "PAI" header may include authenticated information (e.g., via digest authentication). Communication 220 may also include a "Privacy" header that delineates portions of the PAI header that must be removed before they are transmitted to an element that is not trusted. In some examples, an assertion of privacy may by indicated in the "PAI" header. As should be appreciated, the communication 220 may include additional SIP headers.

In some examples, the network server 245 may operate to determine the application server 248 based on the calling party's telephone number or enterprise specific domain. In SIP, the calling party 110 may generally be identified by the identity included in the "FROM" header field, or alternatively, in the "PAI" header if this header is available and if the communication 220 asserts privacy.

The network server 245 may further provide a message 222 to the ingress gateway 225 including an indication of the application server 248 to direct the communication 220 to for performing various application server processes prior to assigning the communication 220 to a virtual trunk.

One example application server process may include operations for determining the attestation level for which the communication 220 may be eligible. In some examples, a provider of the customer network 205 and/or the native network domain 230 may specify or otherwise indicate that calls originating from the customer network 205 and/or trunk 215 be provided a particular level of attestation.

For example, the service provider may specify that communications from Company A and originating from its trunk 215 may be attested at Level A. Thus, when a communication 220 is received from Company A, the application server 248 may compare one or more properties of the communication 220 (e.g., the domain, the trunk and/or the telephone number) with information stored in the database 240 to determine whether the communication 220 should be attested at the requested attestation level.

If the application server 248 determines, based on the information contained in the database 240 and the information or other properties associated with the communication 220, that the communication 220 includes a phone number that the communication service provider assigned to the particular enterprise, the communication 220 may be eligible for Level A attestation.

In another example, the application server 248 may determine, based on one or more properties associated with the communication and/or on information contained in the database 240, that the communication 220 originates from the customer network 205 but is not using an assigned phone number. As such, a determination may be made that the communication 220 is eligible for Level B attestation.

In another example, if the application server 248 receives a communication 220 (either from the ingress gateway 225 or another ingress gateway) and is not able to determine (based on one or more properties associated with the communication 220 and/or information contained in the database 240) the enterprise or the subscriber number from which the communication 220 originated, a determination may be made that the communication 220 is eligible for Level C attestation.

According to one example implementation, the application server 248 may operate to first determine whether the "PAI" header is present and whether the communication 220 includes a privacy assertion. For example, if the "PAI" header is present and the communication 220 asserts privacy, the application server 248 may utilize information in the "PAI" header to determine the attestation level for which the communication 220 may be eligible. If the "PAI" header is not present or if the communication 220 does not include a privacy assertion, the application server 248 may utilize information in the "FROM" header to determine the attestation level for the communication 220.

According to an example, using the "PAI" header or the "FROM" header, the application server 248 may operate to determine whether the calling party's URI is a known assigned telephone number (e.g., a subscriber telephone number) or an unknown telephone number (e.g., a non-subscriber telephone number). If the application server 248 determines, based on the information contained in the database 240, that the calling party's URI includes a telephone number that the communication service provider assigned to the particular enterprise, the communication 220 may be determined to be eligible for Level A attestation. Accordingly, the code assignment system 280 may append a code to the communication 220 that may indicate to the network server 245 a virtual trunk to assign to the communication 220 so that the communication 220 can be attested at the level at which the communication 220 is eligible (e.g., attestation Level A). According to one example implementation, the code may comprise a carrier identification code (CIC) value 252. CIC values, in general, may be included in standard signaling information (such as in a Request URI header of an INVITE message from application server 248 to network server 245) and used to identify a network (such as a long-distance network or internet service provider) that will be used to transmit a communication. For example, if the communication is a toll-free phone call, an end office will query a database of toll-free communication information, referred to herein as the "8SMS" database for a CIC associated with the dialed, toll-free number. The 8SMS database returns a CIC that is used by the end office to route the communication, such as communication 220, to the correct network (such as native network domain 230). Once the communication 220 is received at native network domain 230, however, the CIC value is no longer needed for routing. As such, the CIC value in the header may be used for other purposes, such as by the code assignment system 280. In addition, in some instances, the CIC value may not be included in the communication 220 when received at ingress gateway 225. In examples, a CIC value 252 including or comprising a code indicative of the level at which the communication 220 is eligible for attestation may be appended to the calling party's telephone number in the "PAI" or "FROM" header of the communication 220. In examples where the communication 220 already includes a CIC value, the new CIC value 252 including and/or comprising the code replaces the CIC value in the communication 220.

In some examples, the code assignment system 280 may operate to modify the calling device's calling number portion of the URI in the "FROM" header of the communication 220. For example, the code assignment system 280 may replace the calling device's 210 unrecognized SIP telephone number in the "FROM" header with the database-verified pilot telephone number in the "PAI" header, and may further append the CIC value 252 to the pilot telephone number in the modified "FROM" header or other header of the communication 220.

Alternatively, if the application server 248 determines, based on the information contained in the database 240, that the calling party's telephone number in the URI is not a subscriber telephone number based on the information included in the database 240, the code assignment system 280 may append a CIC value 252 to the communication 220 (or replace the existing CIC value in the communication 220) that may indicate to the network server 245 a virtual trunk to assign to the communication 220 so that the communication 220 can be attested at the level at which the communication 220 is eligible (e.g., attestation Level B). For example, attestation Level B may indicate that the communication 220 originates from the customer network 205 but is not using an assigned phone number.

In some examples, the application server 248 may further operate to request signaling information for the communication 220 from the network server 245. For example, the application server 248 may request signaling instructions from the network server 245 for directing the communication 220 to a gateway 254 and to its targeted destination. According to an example, when requesting signaling instructions, the application server 248 may operate to provide information about the communication 220 to the network server 245, such as the pilot telephone number and the appended CIC value 252. The network server 245 may be configured to use the virtual trunk creation system 285 to create a virtual trunk associated with a particular attestation level, and may further use the virtual trunk assignment system 290 to determine which virtual trunk to assign the communication 220 to based on the CIC value 252 so that the communication 220 may be attested at the particular attestation level. For example, the CIC value 252 may enable the application server 248 to provide an indication to the network server 245 that the communication 220 is eligible for a particular attestation level, and the network server 245 may provide signaling information, including virtual trunk assignment information corresponding to the particular attestation level, to the application server 248.

In some examples, the trunk assignment system 290 may be configured to translate the CIC value 252 to an originating trunk group (OTG) value 253. The OTG value 253, for example, may correspond with a particular virtual trunk and may indicate that the communication 220 is to be assigned to the particular virtual trunk. According to an example, the virtual trunk creation system 285 may be configured to create three different virtual trunks, wherein each virtual trunk is associated with a particular attestation level. For example, the virtual trunk creation system 285 may create a first virtual trunk associated with a first attestation level. If the virtual trunk assignment system 290 assigns the communication 220 an OTG value 253 corresponding to the first virtual trunk, the communication 220 may subsequently be attested at the first attestation level.

Likewise, if the virtual trunk creation system 285 creates a second virtual trunk associated with a second attestation level, the virtual trunk assignment system 290 may assign the communication 220 an OTG value 253 corresponding to the second virtual trunk. Thus, the communication 220 may subsequently be attested at the second attestation level.

Moreover, the virtual trunk creation system 285 may create a third virtual trunk associated with a third attestation level. If the virtual trunk assignment system 290 assigns the communication 220 an OTG value 253 corresponding to the third virtual trunk, the communication 220 may subsequently be attested at the third attestation level. Although three virtual trunks are specifically mentioned, the virtual trunk creation system 285 may create any number of virtual trunks.

In some examples, the network server 245 may operate to provide the determined signaling information for the communication 220, including the translated OTG value 253, to the application server 248. When the application server 248 receives the signaling information, the application server 248 may be configured to use the tagging system 285 to provide or otherwise append a tag to the communication 220 to generate a tagged communication 250. As previously mentioned, the tag indicates that the tagged communication 250 is eligible for a particular attestation level. According to an example, the tag may be or include the OTG value 253.

Once the communication 220 has been tagged by tagging system 285, the tagged communication 250 is provided to a gateway 254 based on the signaling information. The gateway 254 may then direct the tagged communication 250 to the core routing engine 255. The core routing engine 255 may then determine, based at least in part on the tag, the attestation level to assign to the tagged communication 250. The core routing engine 255 may operate to assign an attestation value to the communication corresponding to the attestation level. In some examples, the core routing engine 255 may not have knowledge about which enterprise is associated with the calling party 110 based on standard signaling information. For example, the core routing engine 255 may rely on the tag appended to the communication (tagged communication 250) to make a determination on the attestation level value to assign to the communication. That is the tag may communicate attestation level eligibility information to the core routing engine 255 without utilizing standard STIR/SHAKEN protocol signaling. The core routing engine 255 may then provide the attested communication to a signing server 260 or directly to the egress gateway 265 (depending on whether the destination network 270 is an "untrusted" network. The signing server 260 may operate to attach a signed certificate to the attested communication and encode the attestation level value. For example, the attested and signed communication may include the attestation level value, indicating that the tagged communication 250 has been attested at a particular attestation level (e.g., Level A, B, or C).

In one example, the signing server 260 may then provide the attested and signed communication back to the core routing engine 255. The core routing engine 255 subsequently provides the attested and signed communication to the egress gateway 265. In another example, the signing server 260 may provide the attested and signed communication to the egress gateway 265 without providing the attested communication and the certificate back to the core routing engine 255. Once the attested, the communication and encrypted certificate are provided to the egress gateway 265, the egress gateway 265 may provide the attested communication and encrypted certificate to a destination network 270 for delivery to the destination device 275.

Figure 3A:
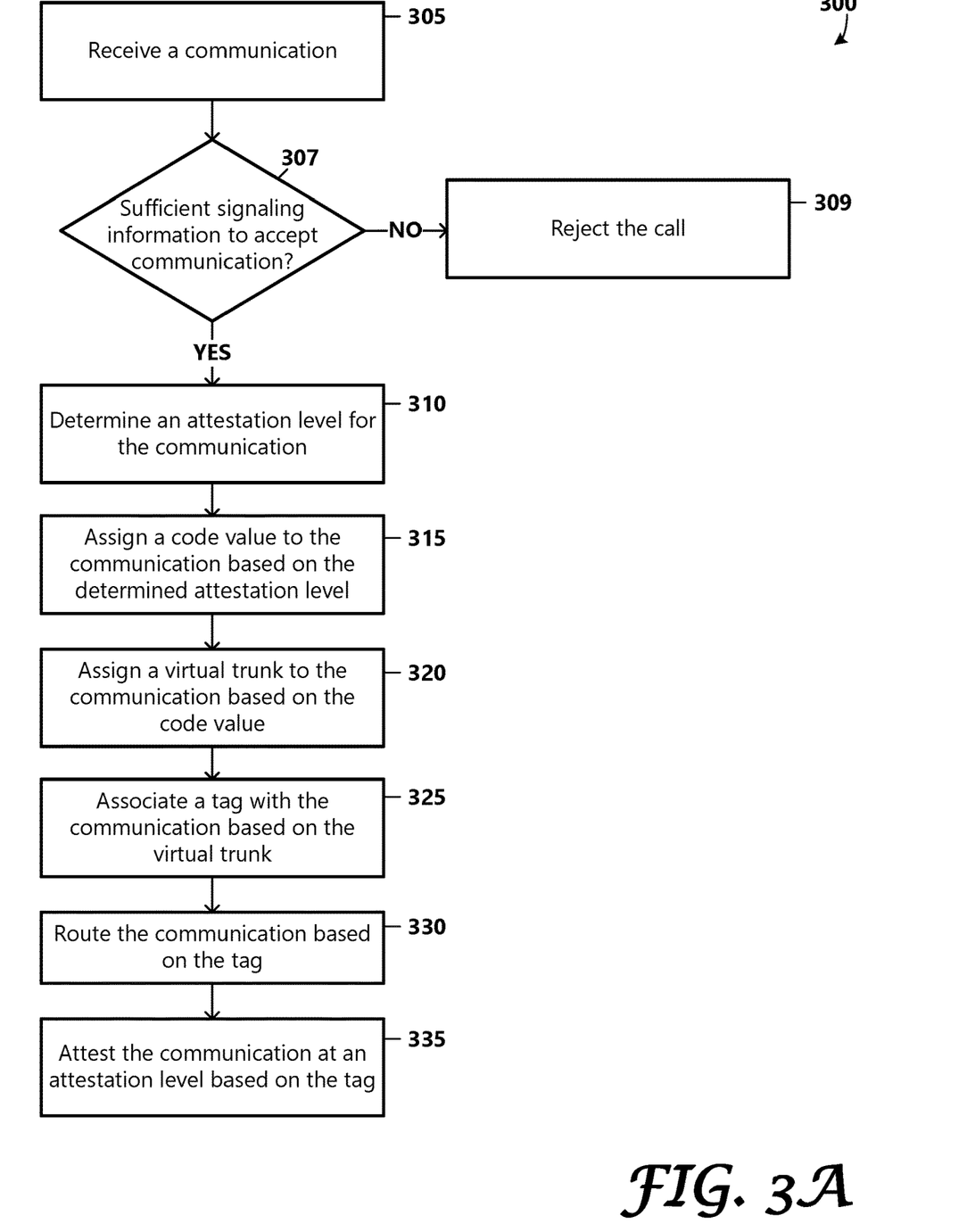
FIG. 3A illustrates an example method for providing an attestation level to a communication.

FIG. 3A illustrates a method 300 for providing an attestation level to a communication according to one or more examples. According to an aspect, the method 300 may include general stages of an example process for carrying attestation level information in a SIP message. In some examples, the method 300 may be implemented by the system 200 shown and described with respect to FIG. 2.

Method 300 begins when a communication 220 is received (305) by a native network domain 230. In some examples, the communication 220 is received by an ingress gateway 225 of the native network domain 230 such as previously described. The communication 220 may be a telephone call in a VoIP system, a telephone call in a cellular system, a telephone call in a PSTN system, etc.

Once the communication 220 is received, a determination (307) may be made as to whether signaling information included in the communication 220 may be sufficient for accepting the communication 220. For example, a communication 220 may be received that may include signaling information that is not valid. In some examples, when the communication 220 does not have sufficient signaling information, the call may be rejected (309).

In other examples, when the signaling information is determined (307) to be sufficient, an attestation level for the communication 220 may be determined (310). One example method of determining the attestation level is described below with reference to FIG. 3B.

When an attestation level is determined (310) for the communication 220, the method 300 may assign (315) a code value associated with the determined attestation level to the communication 220. For example, the code value may be a CIC value 252 appended to the communication's header information, wherein the CIC value 252 may be utilized to carry an indication of the determined attestation level. According to one example, the CIC value 252 may be included in a request URI header in the communication 220.

Based on the results of the comparison(s), a virtual trunk may be assigned 320 to the communication 220 based on the CIC value 252 appended to the communication 220 header information. For example, the method 300 may translate the CIC value 252 to an OTG value 254, wherein the OTG value 254 may correspond to a particular virtual trunk. As described above, the virtual trunk may be created by the network server 245 and may be associated with the determined attestation level as indicated by the CIC value 252. In some examples, the OTG value 254 and other signaling information may be communicated to the application server 248.

When the signaling information, including the OTG value 254, is received, a tag may be appended to or otherwise associated (325) with the received communication 220 to generate a tagged communication 250. For example, the tag may include the OTG value 254 corresponding to the attestation level associated with the CIC value 252 assigned to the communication 220. In some examples, the OTG value 254 may be included in a "FROM" header of the tagged communication 250. In some examples, the CIC value 252 may be included in a "TO" header of the tagged communication 250.

Once the received communication 220 has been tagged, the tagged communication 250 may be routed (330) to a number of different systems based on the tag. In one example, the tagged communication 250 is routed (350) to a gateway 254 and then to a second routing engine, such as, for example, a core routing engine 255 such as previously described. The core routing engine 255 may determine, based on information in the tag, the attestation level to assign the communication. For example, if the tag indicates the tagged communication 250 is eligible for a particular level of attestation, the core routing engine 255 may assign (335) the corresponding attestation level value to the communication using STIR/SHAKEN signaling, and provide the communication and the attestation level value to a signing server 260. The signing server 260 subsequently attaches an encrypted certificate and an encoding of the received attestation level value to the tagged communication 250 that enables a terminating service provider system 106 to verify that the communication is attested at the particular level. The signing server 260 may either provide the attested and signed communication back to the core routing engine 255, or may provide the attested and signed communication to the egress gateway 265 of the native network domain 230.

Figure 3B:
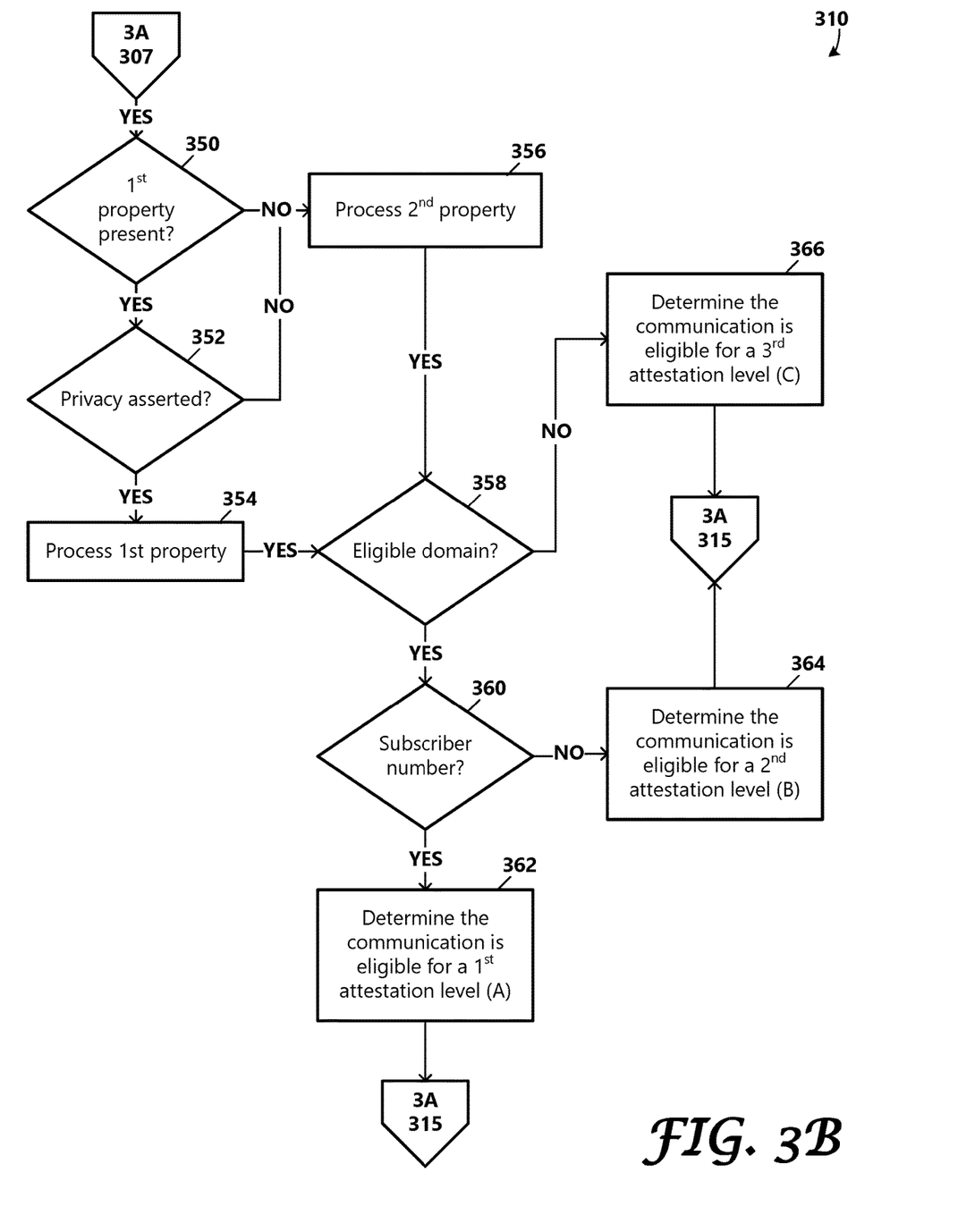
FIG. 3B illustrates an example method for determining the attestation level.

FIG. 3B illustrates one example method 310 for determining an attestation level at which a communication 220 may be eligible to be attested. For example, the determination of the attestation level may be used to determine a code value 252 (e.g., CIC code value) to include in the communication 220. As described above, the CIC code value 252 may be used to communicate attestation level information to the core routing engine 255 using standard signaling information for enabling the core routing engine 255 to attest the communication 220 using STIR/SHAKEN signaling information. In some examples, the method 310 may be implemented by the enterprise routing engine 235 shown and described with respect to FIG. 2.

The method 310 begins when a determination (350) is made as to whether the communication 220 includes a first property. According to one example implementation, the first property may be a "PAI" header that may comprise one or a plurality of parameters. For example, the "PAI" header may include one or more of a domain associated with an enterprise from which the call originated, an originating telephone number associated with the communication 220, and so on. According to an example, the domain and the telephone number may be included in a URI associated with the calling party 110.

When the communication 220 is determined (350) to include the first property, a determination (352) is made as to whether privacy is asserted. For example, the communication 220 may be evaluated for whether a privacy header or other indication of privacy may be included. When the communication 220 is determined (352) to assert privacy, the first property is used to determine an attestation level for which the communication 220 is eligible.

When the communication 220 is determined (350) to not include the first property or privacy is not asserted, a second property is used to determine an attestation level for which the communication 220 is eligible. According to one example implementation, the second property may be a "FROM" header that may comprise one or a plurality of parameters. For example, the "FROM" header may include one or more of a domain associated with an enterprise from which the call originated, an originating telephone number associated with the communication 220, and so on. According to an example, the domain and the telephone number may be included in a URI associated with the calling party 110.

Using either information included in the "PAI" header or the "FROM" header, a determination (358) may be made as to whether the URI (e.g., calling_user_tn@domain) includes an eligible domain. For example, the domain may be compared against enterprise information stored in the database 240. When the communication 220 is determined (358) to include an eligible domain, a determination (360) may be made as to whether the calling party's telephone number is a subscriber number. For example, the calling party's telephone number in the URI may be compared against subscriber information for the determined domain included in the database 240.

When the communication 220 is determined (360) to include a subscriber number, the communication 220 may be determined (362) to be eligible to be attested at a first attestation level (e.g., attestation level A). The method 310 may then proceed to OPERATION 315 in FIG. 3A. When a determination (360) cannot be made that the calling party's telephone number in the URI is a subscriber number, the communication 220 may be determined (364) to be eligible to be attested at a second attestation level (e.g., attestation level B). The method 310 may then proceed to OPERATION 315 in FIG. 3A.

When a determination (358) cannot be made that the calling party's domain is an eligible domain, for example, based on enterprise information included in the database 240, the communication 220 may be determined (366) to be eligible to be attested at a third attestation level (e.g., attestation level C). The method 310 may then proceed to OPERATION 315 in FIG. 3A.

Figure 4:
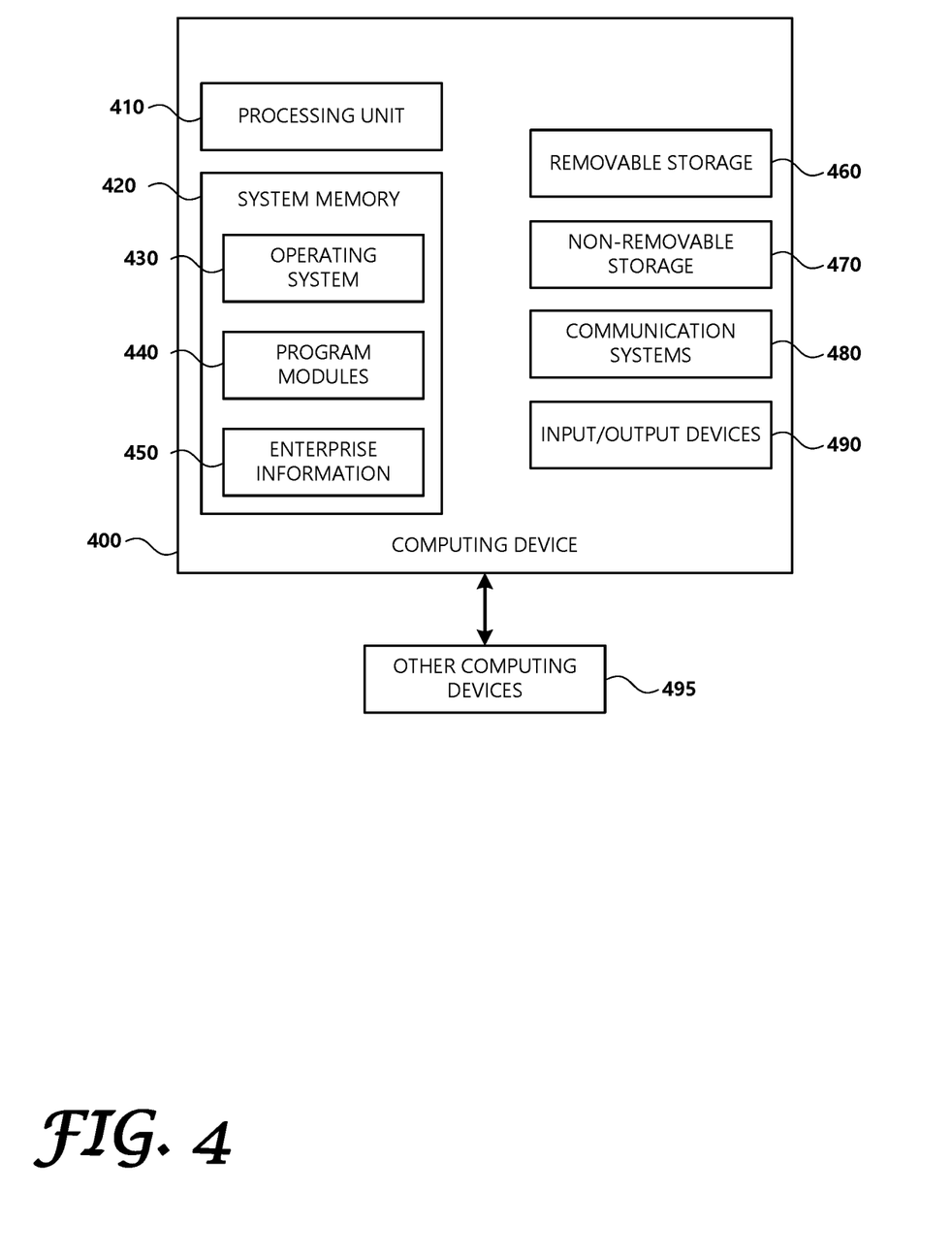
FIG. 4 is a block diagram of a computing device with which one or more aspects of the disclosure may be implemented.

FIG. 4 is a system diagram of a computing device 400 according to an example. The computing device 400, or various components and systems of the computing device 400, may be integrated or associated with an enterprise routing engine 235, a gateway 254, a core routing engine 255, a signing server 260, a customer network 205, an ingress gateway 225, an egress gateway 265, a code assignment system 280, a tagging system 285, or a destination network 270. As shown in FIG. 4, the physical components (e.g., hardware) of the computing device 400 are illustrated and these physical components may be used to practice the various aspects of the present disclosure.

The computing device 400 may include at least one processing unit 410 and a system memory 420. The system memory 420 may include, but is not limited to, volatile storage (e.g., random access memory), non-volatile storage (e.g., read-only memory), flash memory, or any combination of such memories. The system memory 420 may also include an operating system 430 that controls the operation of the computing device 400 and one or more program modules 440. The program modules 440 may be responsible for gathering or determining enterprise information 450 such as domain information, telephone numbers, attestation level requests and so on. A number of different program modules and data files may be stored in the system memory 420. While executing on the processing unit 410, the program modules 440 may perform the various processes described above.

The computing device 400 may also have additional features or functionality. For example, the computing device 400 may include additional data storage devices (e.g., removable and/or non-removable storage devices) such as, for example, magnetic disks, optical disks, or tape. These additional storage devices are labeled as a removable storage 460 and a non-removable storage 470.

Examples of the disclosure may also be practiced in an electrical circuit comprising discrete electronic elements, packaged or integrated electronic chips containing logic gates, a circuit utilizing a microprocessor, or on a single chip containing electronic elements or microprocessors. For example, examples of the disclosure may be practiced via a system-on-a-chip (SOC) where each or many of the components illustrated in FIG. 4 may be integrated onto a single integrated circuit. Such a SOC device may include one or more processing units, graphics units, communications units, system virtualization units and various application functionality all of which are integrated (or "burned") onto the chip substrate as a single integrated circuit.

When operating via a SOC, the functionality, described herein, may be operated via application-specific logic integrated with other components of the computing device 400 on the single integrated circuit (chip). The disclosure may also be practiced using other technologies capable of performing logical operations such as, for example, AND, OR, and NOT, including but not limited to mechanical, optical, fluidic, and quantum technologies.

The computing device 400 may include one or more communication systems 480 that enable the computing device 400 to communicate with other computing devices 495 such as, for example, routing engines, gateways, signings systems and the like. Examples of communication systems 480 include, but are not limited to, wireless communications, wired communications, cellular communications, radio frequency (RF) transmitter, receiver, and/or transceiver circuitry, a Controller Area Network (CAN) bus, a universal serial bus (USB), parallel, serial ports, etc.

The computing device 400 may also have one or more input devices and/or one or more output devices shown as input/output devices 490. These input/output devices 490 may include a keyboard, a sound or voice input device, haptic devices, a touch, force and/or swipe input device, a display, speakers, etc. The aforementioned devices are examples and others may be used.

The term computer-readable media as used herein may include computer storage media. Computer storage media may include volatile and nonvolatile, removable and non-removable media implemented in any method or technology for storage of information, such as computer readable instructions, data structures, or program modules.

The system memory 420, the removable storage 460, and the non-removable storage 470 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 400. Any such computer storage media may be part of the computing device 400. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively rearranged, included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A method, comprising:
   receiving a communication addressed to a destination network;
   determining a uniform resource identifier associated with a calling party of the communication;
   determining, based at least in part on the uniform resource identifier, an attestation level for which the communication is eligible;
   appending a code to the communication, wherein the code indicates the attestation level;
   using the appended code to determine a virtual trunk to assign to the communication, wherein the assigned virtual trunk is associated with the attestation level;
   associating a tag with the communication, wherein the tag corresponds to the virtual trunk; and
   providing the communication to a routing engine via the virtual trunk for providing an attestation based at least in part on the tag.

2. The method of claim 1, wherein appending the code comprises assigning a carrier identification code value.

3. The method of claim 2, wherein determining the attestation level for which the communication is eligible comprises:
   determining, based on the uniform resource identifier, an originating telephone number and an originating domain;
   when the originating domain is determined to be an eligible enterprise specific domain, determining whether the originating telephone number is associated with the enterprise specific domain and a subscriber number;
   when the originating telephone number is associated with the enterprise specific domain and a subscriber number, determining that the communication is eligible for a first level of attestation; and
   when the originating telephone number is associated with the enterprise specific domain and not a subscriber number, determining that the communication is eligible for a second level of attestation; and
   when the originating domain is determined to not be an eligible enterprise specific domain, determining that the communication is eligible for a third level of attestation.

4. The method of claim 3, wherein determining the uniform resource identifier associated with the calling party of the communication comprises:
   determining whether the communication includes a "P-Asserted-Identity" header;
   when the communication includes the "P-Asserted-Identity" header, determining whether the communication includes an assertion of privacy;
   when the communication includes the assertion of privacy, using the uniform resource identifier associated with the calling party included in the "P-Asserted-Identity" header; and
   when the communication does not include the "P-Asserted-Identity" header or does not include the assertion of privacy, using the uniform resource identifier associated with the calling party included in a "FROM" header.

5. The method of claim 4, wherein appending the code comprises appending the carrier identification code value to the used uniform resource identifier.

6. The method of claim 5, wherein using the appended code to determine the virtual trunk to assign to the communication comprises translating the carrier identification code value to an originating trunk group (OTG) value, wherein the OTG value corresponds with the virtual trunk.

7. The method of claim 6, wherein associating the tag with the communication comprises associating the OTG value with the communication.

8. The method of claim 1, further comprising:
   providing, by the routing engine, the attestation at the attestation level; and
   routing the communication with the attestation to the destination network.

9. The method of claim 8, wherein the attestation is encoded and an encrypted certificate is attached to the communication by a signing server.

10. A system, comprising:
    a computing device operating a first routing engine for associating a tag with a received communication, wherein the computing device includes at least one processor and non-volatile memory operatively connected to the at least one processor storing instructions that, when executed by the processor, cause the first routing engine to:
    receive a communication addressed to a destination network;
    determine a uniform resource locator associated with a calling party of the communication;
    determine, based at least in part on the uniform resource locator, an attestation level for which the communication is eligible;
    append a code to the communication, wherein the code indicates the attestation level;
    use the appended code to determine a virtual trunk to assign to the communication, wherein the assigned virtual trunk is associated with the attestation level;
    associate a tag with the communication, wherein the tag corresponds to the virtual trunk; and
    provide the communication to a second routing engine via the virtual trunk for providing an attestation based at least in part on the tag.

11. The system of claim 10, wherein the code is a carrier identification code value.

12. The system of claim 11, wherein in using the appended code to determine the virtual trunk to assign to the communication, the first routing engine operates to translate the carrier identification code value to an originating trunk group (OTG) value, wherein the OTG value corresponds with the virtual trunk.

13. The system of claim 12, wherein the tag includes the OTG value.

14. The system of claim 10, wherein:
the communication is a Session Initiation Protocol (SIP) communication including a plurality of SIP headers;
the OTG value is included in a "TO" SIP header.

15. The system of claim 10, further comprising the second routing engine, wherein the second routing engine operates to:
provide the attestation at the attestation level; and
route the communication with the attestation to the destination network.

16. The system of claim 15, further comprising a signing server that operates to encode the communication and an encrypted certificate attached to the communication.

17. The system of claim 10, wherein in determining the attestation level, the first routing engine operates to:
determine, based on the uniform resource identifier, an originating telephone number and an originating domain;
when the originating domain is determined to be an eligible enterprise specific domain, determine whether the originating telephone number is associated with the enterprise specific domain and a subscriber telephone;
when the originating telephone number is associated with the enterprise specific domain and a subscriber number, determine that the communication is eligible for a first level of attestation; and
when the originating telephone number is associated with the enterprise specific domain and not a subscriber number, determine that the communication is eligible for a second level of attestation; and
when the originating domain is determined to not be an eligible enterprise specific domain, determine that the communication is eligible for a third level of attestation.

18. The system of claim 17, wherein in determining the uniform resource identifier associated with the calling party of the communication, the first routing engine operates to:
determine whether the communication includes a "P-Asserted-Identity" header;
when the communication includes the "P-Asserted-Identity" header, determining whether the communication includes an assertion of privacy;
when the communication includes the assertion of privacy, use the uniform resource identifier associated with the calling party included in the "P-Asserted-Identity" header; and
when the communication does not include the "P-Asserted-Identity" header or does not include the assertion of privacy, use the uniform resource identifier associated with the calling party included in a "FROM" header.

19. A method comprising:
receiving a communication addressed to a destination network;
determining a uniform resource identifier associated with a calling party of the communication, a first property comprising an originating telephone number and enterprise-specific domain;
determining, based on the uniform resource identifier, an originating telephone number and an originating domain;
when the originating domain is determined to be an eligible enterprise specific domain, determining whether the originating telephone number is associated with the enterprise specific domain and a subscriber telephone;
when the originating telephone number is associated with the enterprise specific domain and a subscriber number, determining that the communication is eligible for a first level of attestation; and
when the originating telephone number is associated with the enterprise specific domain and not a subscriber number, determining that the communication is eligible for a second level of attestation; and
when the originating domain is determined to not be an eligible enterprise specific domain, determining that the communication is eligible for a third level of attestation;
appending a code to the communication, wherein the code indicates the level of attestation;
using the appended code to determine a virtual trunk to assign to the communication, wherein the assigned virtual trunk is associated with the level of attestation;
associating a tag with the communication, wherein the tag corresponds to the virtual trunk;
providing the communication to a routing engine via the virtual trunk;
providing, by the routing engine, an attestation at the level of attestation based at least in part on the tag;
signing the communication with an encrypted certificate; and
routing the communication with the attestation to the destination network.

20. The method of claim 19, wherein using the appended code to determine the virtual trunk to assign to the communication comprises translating a carrier identification code value to an originating trunk group (OTG) value, wherein the OTG value corresponds with the virtual trunk.

* * * * *